US008351059B2

(12) United States Patent
Mori

(10) Patent No.: US 8,351,059 B2
(45) Date of Patent: Jan. 8, 2013

(54) APPARATUS, SYSTEM, AND METHOD OF IMAGE PROCESSING, AND RECORDING MEDIUM STORING IMAGE PROCESSING PROGRAM

(75) Inventor: Shinya Mori, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 430 days.

(21) Appl. No.: 12/720,171

(22) Filed: Mar. 9, 2010

(65) Prior Publication Data
US 2010/0231949 A1    Sep. 16, 2010

(30) Foreign Application Priority Data

Mar. 13, 2009  (JP) ................................. 2009-061036
Oct. 23, 2009  (JP) ................................. 2009-243939

(51) Int. Cl.
*G06F 15/00*  (2006.01)
*G06K 1/00*  (2006.01)

(52) U.S. Cl. ..................................... 358/1.14; 358/1.15
(58) Field of Classification Search ....................... None
See application file for complete search history.

(56) References Cited

U.S. PATENT DOCUMENTS

2008/0068638 A1    3/2008  Yagi
2009/0161152 A1    6/2009  Mori

FOREIGN PATENT DOCUMENTS

JP    2005-208934    8/2005
JP    2008-97586    4/2008

*Primary Examiner* — Thierry Pham
(74) *Attorney, Agent, or Firm* — Oblon, Spivak, McClelland, Maier & Neustadt, L.L.P.

(57) ABSTRACT

An image input apparatus determines whether an image input apparatus that has sent image data is an authorized sender when storing of the image data to a specific storage area is detected. According to a determination result indicating that the image input apparatus is the authorized sender, the image input apparatus applying one or more processes to the image data.

18 Claims, 15 Drawing Sheets

FIG. 6A

| SENDER IP ADDRESS | PATH |
|---|---|
| xxx.xxx.xxx.xx5 | C:¥ftp¥folder1¥doc0903041200.*** |
| xxx.xxx.xxx.xx1 | C:¥ftp¥folder1¥doc0903050921.*** |
| xxx.xxx.xxx.xx5 | C:¥ftp¥folder1¥doc0903051114.*** |
| ⋮ | ⋮ |

| NO. OF LICENSE | 10 |
|---|---|

| REGISTERED IP ADDRESS | AUTHORIZATION |
|---|---|
| xxx.xxx.xxx.xx1 | AUTHORIZED |
| xxx.xxx.xxx.xx2 | AUTHORIZED |
| xxx.xxx.xxx.xx5 | AUTHORIZED |

| MONITOR FOLDER | FLOW DATA ID |
|---|---|
| C:¥ftp¥folder1 | flow001 |
| C:¥ftp¥folder2 | flow002 |
| C:¥ftp¥folder3 | flow003 |

```
<?xml version="1.0"?>
<Distribution>
//DESCRIBE FLOW ID AND BIBLIOGRAPHIC INFORMATION
        <ID>CONTRACT FLOW</ID>
            <LinkedPropertyScreen>BIBLIOGRAPHIC INFORMATION FOR CONTRACT
            </LinkedPropertyScreen>
        //DESCRIBE IMAGE CONVERSION
        <Plugin>
            <PluginID>ImageConverter</PluginID>
            <PluginType>filter</PluginType>
            <Parameters>
                <FileFormat>PDF</FileFormat>
            </Parameters>
            <Next>
            //DESCRIBE FOLDER DISTRIBUTION TO BE PERFORMED
            AFTER IMAGE CONVERSION
                <Plugin>
                    <PluginID>ToFolder</PluginID>
                    <PluginType>Output</PluginType>         232
                    <Parameters>
                        <FileName>CONTRACT[Date]</FileName>
                        <Destination>
                            <Path>111.111.111.***¥Folder_1</Path>
                            <Path>111.111.111.***¥Folder_2</Path>
                        </Destination>
                    </Parameters>
                </Plugin>
            </Next>
        </Plugin>
        //DESCRIBE EMAIL TO BE PERFORMED IN PARALLEL TO IMAGE
        CONVERSION
        <Plugin>
            <PluginID>ToEmail</PluginID>
            <PluginType>Output</PluginType>
            <Parameters>
                <SmtpServer>111.111.111.***</SmtpServer>
                <Sender>abc@xxx.yyy.co.jp</Sender>        234
                <Subject>CONTRACT[Date]</Subject>    236
                <Body>SENT FROM [USER NAME]</Body>
                <FileName>CONTRACT[Date] [USER NAME]</FileName>
                <Destination>
                    <Address>dest1@xxx.yyy.co.jp</Address>    238
                    <Address>dest2@xxx.yyy.co.jp</Address>
                </Destination>
            </Parameters>
        </Plugin>
</Distribution>
```

FIG. 8A

```
<Biblog>
        <ID>BIBLIOGRAPHIC INFORMATION</ID>
        <Item>
        <Date>20090304</Date>
        <UserName>SUZUKI</UserName>
</Biblog>
```

```
<?xml version="1.0" ?>
<Distribution>
//DESCRIBE FLOW ID AND BIBLIOGRAPHIC INFORMATION
    <ID>CONTRACT FLOW</ID>
        <LinkedPropertyScreen>BIBLIOGRAPHIC INFORMATION FOR CONTRACT
        </LinkedPropertyScreen>
        //DESCRIBE IMAGE CONVERSION
        <Plugin>
            <PluginID>ImageConverter</PluginID>
            <PluginType>filter</PluginType>
            <Parameters>
                <FileFormat>PDF</FileFormat>
            </Parameters>
            <Next>
            //DESCRIBE FOLDER DISTRIBUTION TO BE PERFORMED
            AFTER IMAGE CONVERSION
                <Plugin>
                    <PluginID>ToFolder</PluginID>
                    <PluginType>Output</PluginType>
                    <Parameters>
                        <FileName>CONTRACT20xx0101</FileName>
                        <Destination>
                            <Path>111.111.111.***¥Folder_1</Path>
                            <Path>111.111.111.***¥Folder_2</Path>
                        </Destination>
                    </Parameters>
                </Plugin>
            </Next>
        </Plugin>
        //DESCRIBE EMAIL TO BE PERFORMED IN PARALLEL TO IMAGE
        CONVERSION
        <Plugin>
            <PluginID>ToEmail</PluginID>
            <PluginType>Output</PluginType>
            <Parameters>
                <SmtpServer>111.111.111.***</SmtpServer>
                <Sender>abc@xxx.yyy.co.jp</Sender>
                <Subject>CONTRACT20090304</Subject>
                <Body>SENT FROM SUZUKI</Body>
                <FileName>CONTRACT20090304SUZUKI</FileName>
                <Destination>
                    <Address>dest1@xxx.yyy.co.jp</Address>
                    <Address>dest2@xxx.yyy.co.jp</Address>
                </Destination>
            </Parameters>
        </Plugin>
</Distribution>
```

FIG. 9
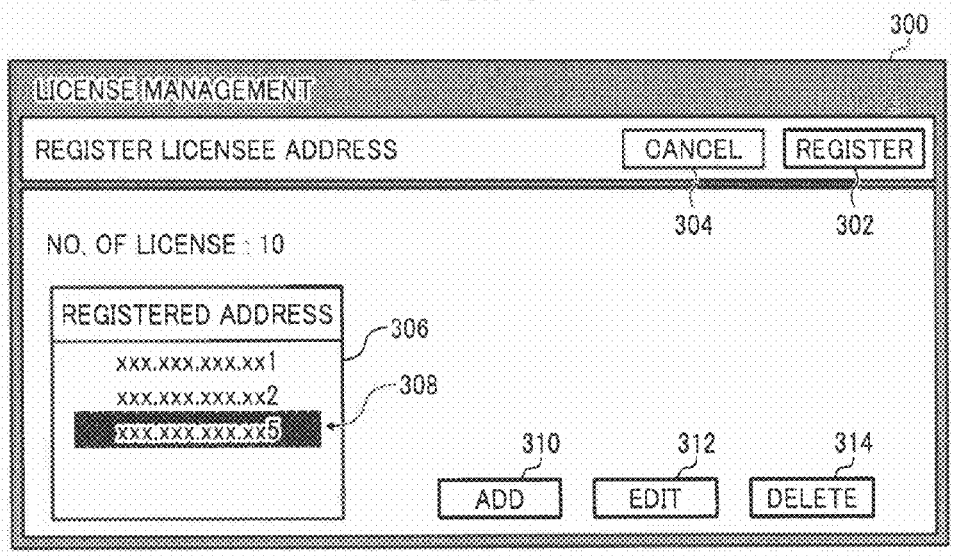
FIG. 10A
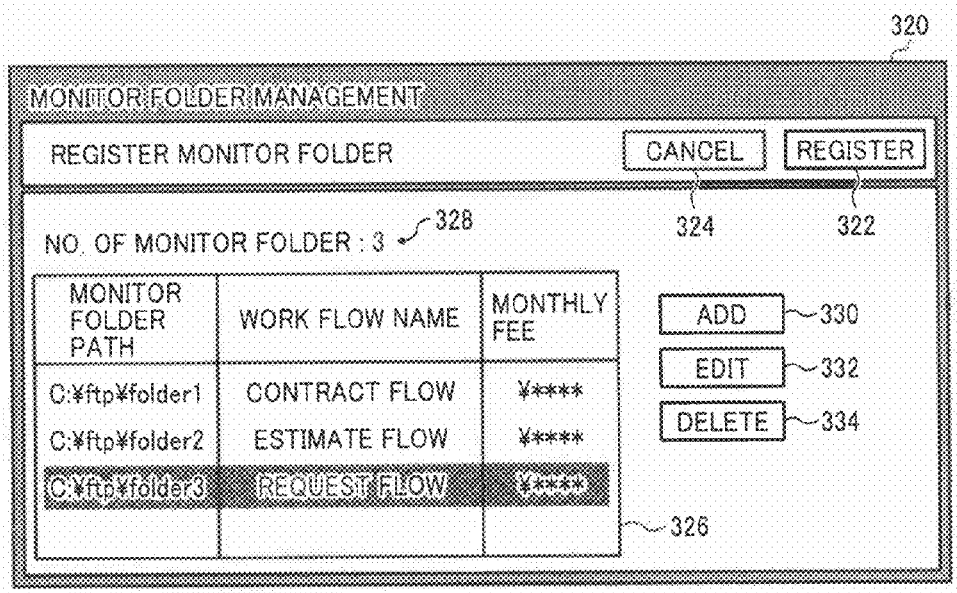
FIG. 10B

FIG. 15

| INDEX NO. | TIME PROCESSED | MONITOR FOLDER | FLOW DATA ID | CHARGE FEE | CLIENT ID |
|---|---|---|---|---|---|
| 1 | 20xx/xx/05 12:25 | C:\ftp\folder1 | flow001 | ¥**** | ClientA |
| 2 | 20xx/xx/05 13:44 | C:\ftp\folder1 | flow001 | ¥**** | ClientB |
| 3 | 20xx/xx/05 13:52 | C:\ftp\folder3 | flow003 | ¥**** | ClientA |
| 4 | 20xx/xx/05 17:05 | C:\ftp\folder2 | flow002 | ¥**** | ClientB |
| 5 | 20xx/xx/06 10:12 | C:\ftp\folder2 | flow002 | ¥**** | ClientC |
| ... | ... | ... | ... | ... | ... |

APPARATUS, SYSTEM, AND METHOD OF IMAGE PROCESSING, AND RECORDING MEDIUM STORING IMAGE PROCESSING PROGRAM

CROSS-REFERENCE TO RELATED APPLICATIONS

This patent application is based on and claims priority under 35 U.S.C. §119 to Japanese Patent Application Nos. 2009-061036 filed on Mar. 13, 2009 and 2009-243939 filed on Oct. 23, 2009, in the Japanese Patent Office, the disclosure of which is hereby incorporated herein by reference.

FIELD OF THE INVENTION

The present invention generally relates to an apparatus, system, and method of image processing and a recording medium storing a control program for image processing, and more specifically to an apparatus, system, and method of managing image processing to be performed on image data and a recording medium storing a control program for managing image processing to be performed on image data.

BACKGROUND

A document distribution system may be provided, which automatically distributes document data scanned from an original document to a desired destination, for example, as described in the Japanese Patent Application Publication No. 2008-97586, the Japanese Patent Application Publication No. 2005-208934, and the US Patent Application Publication No. 2008/0068638.

In order to modify the existing system into the document distribution system, a distribution server for providing the above-described document distribution function needs to be newly installed. Further, the existing document input apparatus that scans the original document into the document data and sends the document data to the distribution server needs to be upgraded to use the document distribution function provided by the newly installed distribution server. For example, in the case of the Japanese Patent Application Publication No. 2008-97586, the existing document input apparatus is installed with a specially designed application.

However, it is not practical to require the user to update every input apparatus in the existing system. In order to allow the existing input apparatus to use the document distribution function provided by the newly installed distribution server without installation of the specially designed application, the distribution server may be caused to monitor a specific folder. When any document data is stored in the specific folder, the distribution server may allow the user to use the document distribution function with respect to the document data stored in the specific folder. While this technique of setting a specific folder for the document distribution function allows the existing input apparatus to use the document distribution function, it may also allow any unauthorized apparatus to use the document distribution function as long as the apparatus has access to the specific folder.

In view of the above, there is a need for a technique of allowing only the authorized apparatus to use the document distribution function without requiring installation of the specially designed application.

SUMMARY

Example embodiments of the present invention include an apparatus, method, system, computer program and product each capable of allowing only the authorized image input apparatus to use the document distribution function even when the authorized image input apparatus is not provided with the specially designed application.

Example embodiments of the present invention include an image processing apparatus to connect to an image input apparatus through a network. The image processing apparatus includes: an image data obtaining device to store image data sent from the image input apparatus through the network in a specific storage area and to store sender identification information for identifying the image input apparatus in association with the obtained image data; an authorization management data storage device to store authorization management data that associates registered sender identification information for identifying a registered image input apparatus and authorization information indicating whether the registered image input apparatus is an authorized sender; an entry controller device to monitor the specific storage area to detect whether the image data is stored in the specific storage area, to determine whether the image input apparatus is the authorized sender by referring to the authorization information of the registered image input apparatus that matches the sender identification information of the image input apparatus to generate a determination result when storing of the image data in the specific storage area is detected, and to enter the document data for further processing according to the determination result indicating that the image input apparatus is the authorized sender; and a flow controller device to obtain flow data defining a sequence of one or more processes, and to apply one or more processes to the entered document data according to the flow data.

In addition to the above-described example embodiments, the present invention may be practiced in various other ways, for example, as an image processing system including the image processing apparatus, a recording medium storing a plurality of instructions which cause a computer to function as the image processing apparatus, or an image processing method performed by the image processing apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6A is a sender address table storing sender address information and document data;

FIG. 6B is an authorized address table storing authorization management data;

FIG. 6C is a flow data table storing monitor folder and flow data;

FIG. 7 is an illustration for explaining a data structure of flow data;

FIG. 8A is an illustration for explaining bibliographic data describing bibliographic information;

FIG. 8B is an illustration for explaining a data structure of flow data after being modified using the bibliographic data of FIG. 8A;

FIG. 9 is an illustration for explaining a management screen provided by the distribution server of FIG. 3;

FIG. 10A is an illustration for explaining a monitor folder management screen provided by the distribution server of FIG. 3;

FIG. 10B is an example charge fee table used by the distribution server of FIG. 3 to calculate a charge fee;

FIG. 15 is a charge data table managed by the distribution server of FIG. 13.

Figure 1:
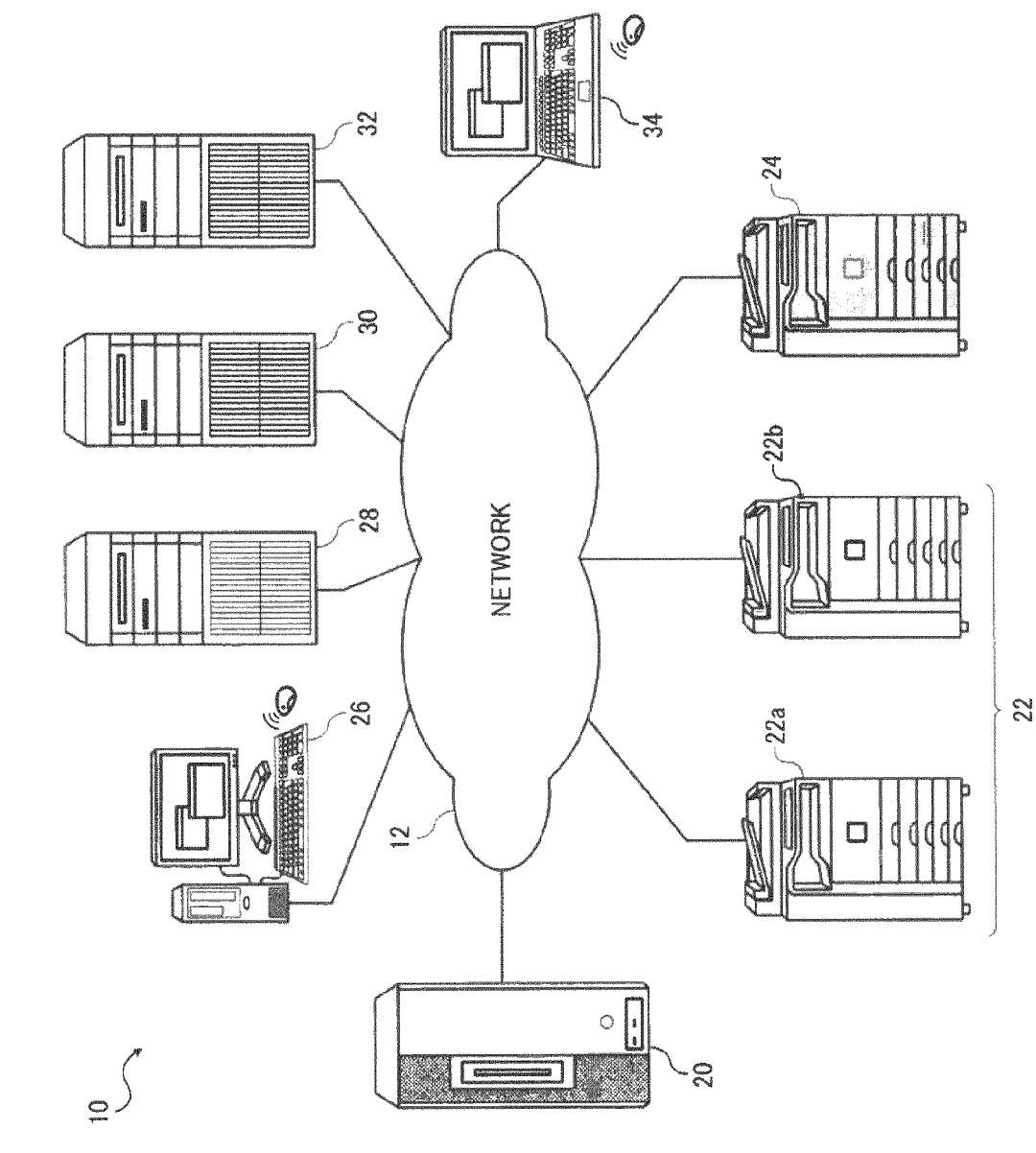
FIG. 1 is a configuration of a document distribution system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring to FIG. 1, a configuration of a document distribution system 10 is explained according to an example embodiment of the present invention. The document distribution system 10 includes a distribution server 20, and a plurality of multifunctional apparatuses (MFP) 22a, 22b, and 24, each of which are connected through a network 12. For the descriptive purpose, the MFP 22a, 22b, and 24 may be collectively referred to as the MFP. The document distribution system 10 further includes a management terminal 26, a file server 28, a document management server 30, a Simple Mail Transfer Protocol (SMTP) server 32, and a personal computer (PC) 34. Under the network environment of FIG. 1, the distribution server 20 communicates with any one of the management terminal 26, file server 28, document management server 30, SMTP server 32, and PC 34 through the network 12.

The network 12 may be implemented by a local area network (LAN), virtual private network (VPN), or a wide area network (WAN) with a specially designed line, for example, using a transaction protocol such as the Ethernet or Transmission Control Protocol/Internet Protocol (TCP/IP). Alternatively, the network 12 may be implemented by the Internet with a router. Further, the network 12 may be implemented by a wired and/or wireless network.

The MFP is provided with the inputting function capable of obtaining document data, and the outputting function capable of sending the document data to the network 12. For example, the MFP may be provided with a scanner device capable of obtaining document data by scanning an original document, or a facsimile device capable of obtaining document data by receiving facsimile data sent from the other apparatus through a communication line. In this example, the document data may include any type of image data including characters, pictures, graphical images, etc., and generated in any desired data format including, for example, BMP, TIFF, JPEG, RAW, PNG, GIF, DCX, PDF, etc. For the descriptive purpose, the document data and the image data may be used exchangeably. Further, the MFP is provided with a communication device capable of sending the document data to the distribution server 20 through the network 12.

When sending the document data, the MFP may send any desired information related to the document data to the distribution server 20 in the form of bibliographic information. For example, the MFP may be provided with a user interface for allowing the user at the MFP to input information such as a type of the original document to be input, a destination to which the document data is transferred, etc. The MFP may generate bibliographic data for specific document data, which describes the bibliographic information input by the user for the specific document data, for example, in an XML format. The MFP may send the bibliographic data to the distribution server 20.

Alternatively, the original document may be embedded with the bibliographic information. In such case, the MFP may extract the bibliographic information, and send the extracted bibliographic information to the distribution server 20 together with the document data scanned from the original document. For example, the bibliographic information indicating a confidential level of the original document may be embedded into the original document.

In this example, the MFP 22a and 22b (collectively referred to as the MFP 22) and the MFP 24 function differently. More specifically, the MFP 24 of FIG. 1 is installed with a document distribution control application, which is a specially designed application for allowing the MFP 24 to use the document distribution function provided by the distribution server 20. For this reason, the MFP 24 may be referred to as the MFP 24 applicable to the document distribution function, or the MFP 24 with the document distribution function. On the other hand, the MFP 22 is not installed with such document distribution control application for allowing the MFP 22 to use the document distribution function provided by the distribution server 20. For this reason, the MFP 22 may be referred to as the MFP 22 not applicable to document distribution function, or the MFP 22 without the document distribution function. Further, any desired number of MFP 22 or 24 may be present on the network 12.

The file server 28 stores and manages data, which may be shared through the network 12. The document management server 30 stores a large amount of data. The SMTP server 32 performs email communication using the SMTP. The PC 34 is a general-purpose computer.

The distribution server 20 receives the document data from the MFP through the network 12. When the MFP is authorized as an authorized sender who is permitted to use the document distribution function, the distribution server 20 applies a sequence of image processing to the document data and sends the document data to any one of the file server 28, the document management server 30, the SMTP server 32, and the PC 34. For the descriptive purpose, any one of the file server 28, the document management server 30, the SMTP server 32, and the PC 34 may be referred to as a destination as it receives the document data sent from the MFP through the distribution server 20.

In this example, the distribution server 20 determines the sequence of image processing applied to the document data and the destination to which the document data is sent according to a distribution flow previously determined. More specifically, the distribution flow determines operation of outputting the document data such as a destination to which the document data is output. For example, the distribution flow may cause the distribution server 20 to perform operation of transferring the document data to the file server 28 using the file transfer function, operation of storing or registering the document data in the document management server 30, operation of sending an email message to the PC 34 via the SMTP server 32 with or without the document data attached, operation of sending a webpage regarding the document data to the PC 34, and operation of transferring the document data to the PC 34, etc.

Further, the distribution flow determines any processing to be applied to the document data before being output. For example, the distribution flow may cause the distribution server 20 to perform operation of applying format conversion to the document data, applying image correction or editing to the document data, operation of selecting a distribution flow according to the bibliographic information extracted from the document data, and operation of converting the bibliographic information, etc.

As described above, the MFP 22 is not applicable to the document distribution function. In order to allow the MFP 22 to use the document distribution function of the distribution server 20, the distribution server 20 is previously set to monitor a specific folder, which is previously set as a monitor folder for entering any document data stored therein as the document data to be processed and distributed according to a distribution flow. More specifically, the distribution server 20 monitors the input or output of the document data with respect to the monitor folder. When the distribution server 20 detects any document data that is sent from the MFP 22 through a standard protocol to the monitor folder, the distribution server 20 determines whether to process the detected document data using the document distribution function. More specifically, rather than allowing any MFP 22 that has sent the document data to the monitor folder to use the document distribution function, the distribution server 20 determines whether the MFP 22 that has sent the document data is authorized to use the document distribution function. When it is determined that the MFP 22 is the authorized sender, the distribution server 20 determines to process the detected document data using the document distribution function. In this example, the standard protocol includes the File Transfer Protocol (FTP), Server Message Block (SMB), or Network File System (NFS). Alternatively, any desired type of standard protocol may be used.

The management terminal 26 allows the user at the management terminal 26, such as an administrator of the document distribution system 10, to set various settings of the distribution server 20. Alternatively, the distribution server 20 may be managed in various other ways, for example, using a user interface device such as an input device and/or an output device when the user interface is provided on the distribution server 20.

Figure 2:
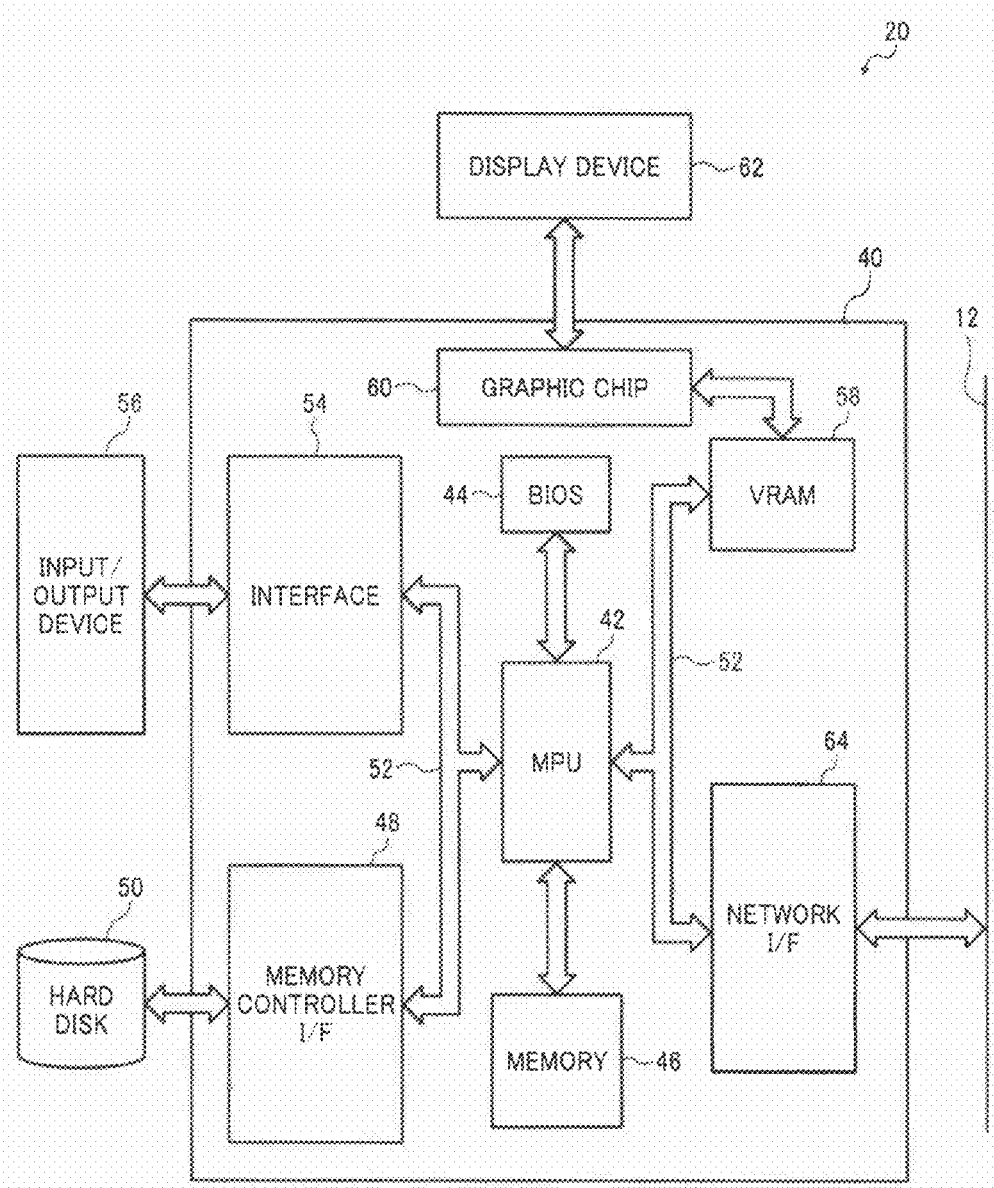
FIG. 2 is a hardware structure of a distribution server of the document distribution system of FIG. 1, according to an example embodiment of the present invention.

Referring now to FIG. 2, a hardware structure of the distribution server 20 is explained according to an example embodiment of the present invention. The distribution server 20 includes a microprocessor unit (MPU) 42, an involatile memory (BIOS) 44 storing therein Basic Input Output System (BIOS), and a memory 46 that may be implemented by a random access memory (RAM). Upon execution, the MPU 42 loads the BIOS from the involatile memory (BIOS) 44 onto the memory 46 functioning as a work area of the MPU 42 to start operation of system diagnosis as well as operation of managing an input/output device 56.

The distribution server 20 is additionally provided with a memory controller interface (I/F) 48, which is connected to the MPU 42 through an internal bus 52. The memory controller I/F 48 writes or reads data to or from a hard disk 50 in response to an input/output request received from the MPU 42. The memory controller interface 48 may manage input or output of data with respect to the hard disk 50, for example, in compliance with the standard such as the Integrated Device Electronics (IDE), AT Attachment (ATA), Serial ATA, UltraATA, etc. The distribution server 20 further includes an interface 54, which may be implemented by a serial or parallel interface such as the USB or IEEE1164. The MPU 42 controls the interface 54 through the internal bus 52 to allow communication with the input/output device 56 to receive a user input or output information for display to the user. In this example, the input/output device 56 may be implemented by, for example, a keyboard, mouse, microphone, speaker, etc. Further, in this example, the input/output device 56 may only be provided with the input device 56.

The distribution server 20 further includes a VRAM 58 and a graphic chip 60. According to an instruction received from the MPU 42, the VRAM 58 and the graphic chip 60 process a video signal to display a screen on a display device 62. The distribution server 20 further includes a network interface (I/F) 64, which may be implemented by a network interface card (NIC). The MPU 42 communicates with the network I/F 64 through the internal bus 52 to allow the distribution server 20 to communicate with the outside apparatus through the network 12. The outside apparatus includes, for example, the MFP 22, 24, the management terminal 26, the file server 28, the document management server 30, the SMTP server 32, and the PC 34.

Further, in this example, the distribution server 20 may load any desired control program, which may be stored in any desired memory such as the involatile memory 44, the hard disk 50, or an optionally provided memory or recording medium such as an NV-RAM or SD card, onto the memory 46. Under control of an operating system (OS), the distribution server 20 is caused to have various functional devices or perform various steps according to a plurality of instructions obtained by deploying the control program onto the memory 46. The examples of the OS include, but not limited to, Windows, Unix, and Linux.

Further, in this example, any one of the file server 28, document server 30, SMTP server 32, PC 34, and management terminal 26 may have a hardware structure substantially similar to the hardware structure illustrated in FIG. 2. The MFP 22 and 24 may each have a hardware structure substantially similar to a hardware structure described below referring to FIG. 11.

Figure 3:
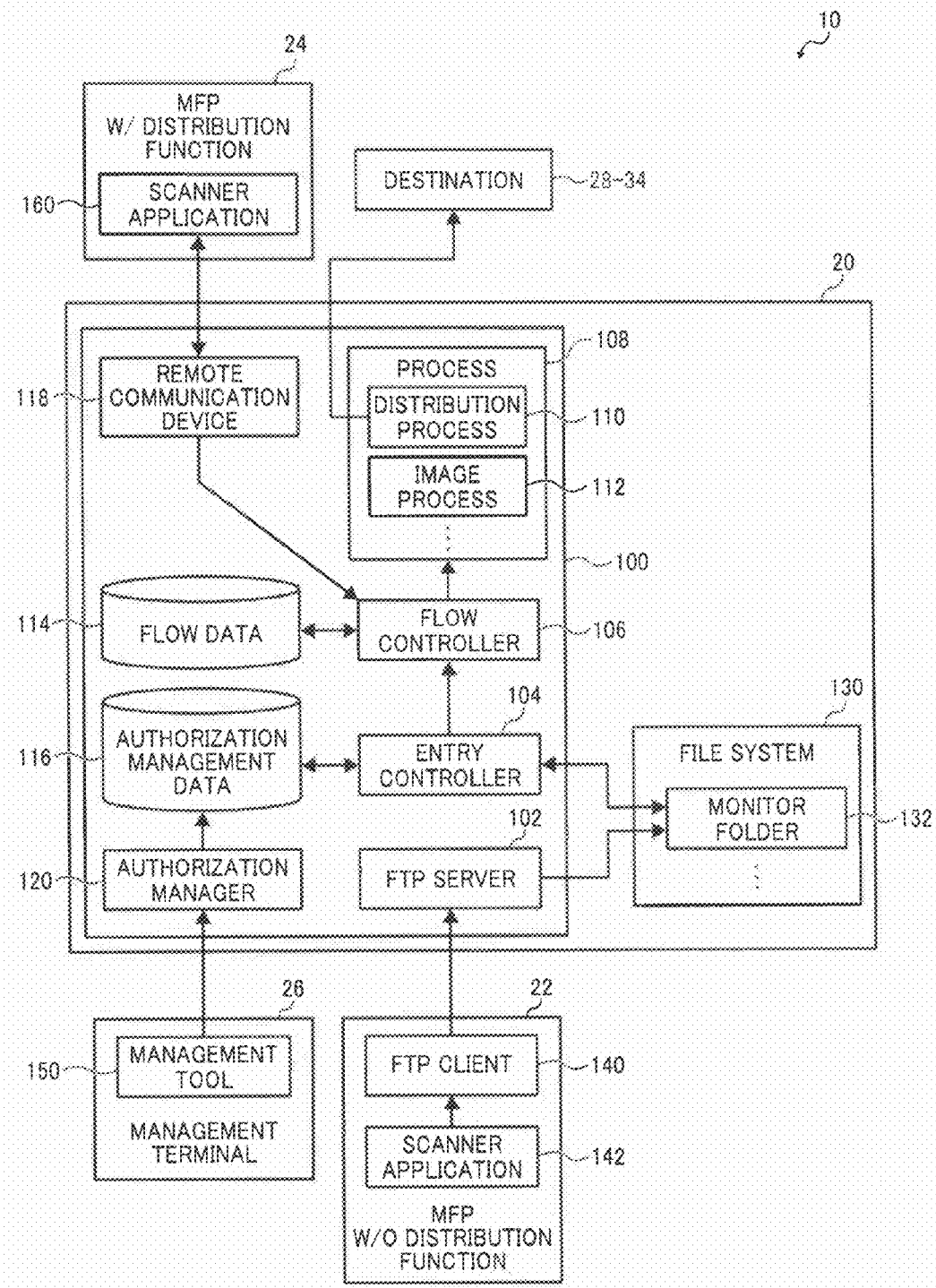
FIG. 3 is a functional structure of the document distribution system of FIG. 1.

Referring now to FIG. 3, a functional structure of the document distribution system 10 is explained according to an example embodiment of the present invention. As illustrated in FIG. 3, the distribution server 20 includes a document distribution application 100 and a file system 130. As described above referring to FIG. 2, the MPU 42 may load the document distribution application 100, which may be previously stored in any desired memory, onto the memory 46 to cause the distribution server 20 to have functional blocks as illustrated in FIG. 3. The file system 130 is provided by the OS previously installed onto the distribution server 20.

The document distribution application 100 may be operated under a platform such as Java VM. The document distribution application 100 includes a FTP server 102. In one example, the FTP server 102 processes a file transfer request received from a FTP client. For example, the FTP server 102 receives a data file from the FTP client and stores the received data file in a specified folder. Alternatively, the FTP server 102 reads a specified data file from a folder, and sends the read file to the FTP client.

The MFP 22 without the distribution function includes a FTP client 140 and a scanner application 142. The scanner application 142 provides the function of scanning. For example, upon receiving an instruction for scanning from the user, the scanner application 142 causes a scanner engine of the MFP 22 to scan an original document into document data. Further, the scanner application 142 may obtain bibliographic information, for example, from the user through a user interface or a device provided on the MFP 22. For example, the scanner application 142 may obtain time information indicating a current time from its device and user information such as a user ID from the user through the user interface, and generate bibliographic information for the document data.

When the user selects to use the document distribution function of the distribution server 20 to process the document data and send the processed document data to a destination, the FTP client 140 communicates with the FTP server 102 of the distribution server 20 according to the FTP protocol, and transfers the document data obtained by the scanner application 142.

The document distribution application 100 further includes a flow data storage 114, an entry controller 104, a flow controller 106, and a process 108 including various processes such as a distribution process 110 and an image process 112. The flow controller 106 calls one or more processes in the process 108 according to a distribution flow defined by flow data selected from the flow data storage 114, and applies processing using the called process to the document data.

The entry controller 104 monitors input or output of a data file with respect to a predetermined folder in the file system 130. The folder subjected for monitoring by the entry controller 104 is referred to as a monitor folder 132. When the entry controller 104 detects that new document data is registered to the monitor folder 132, the entry controller 104 determines whether the new document data has been sent from an authorized sender that is authorized to use the document distribution function of the distribution server 20. When the new document data has been sent from the authorized sender, the entry controller 104 enters the new document data as document data to be processed using the document distribution function of the distribution server 20, and notifies the flow controller 106 that the document data is subjected for further processing. Further, in this example, any desired number of monitor folders 132 may be provided.

In this example, the entry controller 104 determines whether the sender is an authorized sender using an address of the sender ("sender address") that is uniquely assigned to each sender, i.e., each MFP 22. For example, the Internet Protocol (IP) address may be used as the sender address. When the FTP server 102 receives the document data from the sender, the FTP server 102 stores the sender address of the sender who has sent the document data file such that the entry controller 104 is able to easily check whether the sender is an authorized sender using the sender address stored by the FTP server 102. In alternative to the sender address, any sender identification information that is capable of identifying a specific sender may be used to determine whether the sender is an authorized sender.

In one example, the FTP server 102 may manage a sender address table 200 of FIG. 6A. The FTP server 102 adds a new entry every time the FTP server 102 receives document data addressed to the monitor folder 132 from a sender. The sender address table 200 stores sender address information for identifying a sender who sends the document data for each document data. As illustrated in FIG. 6A, the sender address table 200 includes a "SENDER IP ADDRESS" field 200a storing a sender address, and a "PATH" filed 200b storing path information of the document data. The path information of the document data indicates a specific location at which the document data is stored as well as the file name assigned to the document data. The sender address table 200 may be stored in a memory area, which may be provided in the monitor folder 132, such that the sender address table 200 may be accessed by the FTP server 102 and the entry controller 104. The sender address table 200 may be modified so as to reflect the current state of the filing system 130. For example, when the document data is deleted from the filing system 130, the entry corresponding to the deleted document data is deleted from the sender address table 200. In this example, the sender address may be expressed in IP version 4, IP version 6, MAC address, etc. For the descriptive purpose, in this example, the IP version 4 IP address is used. Further, in this example, it is assumed that the FTP protocol is used as the standard protocol. Alternatively, any desired protocol may be used as long as it can be interpreted by the input device and the output device of the sender. As described above referring to FIG. 3, assuming that the sender is the MFP 22, the input device is the scanner application 142 and the output device is the FTP client 140.

Referring back to FIG. 3, the entry controller 104 periodically pulls the monitor folder 132 to check whether there is any new document data that is stored in the monitor folder 132. When there is new document data found, the entry controller 104 determines that the new document data is detected for further determination of whether to enter the document data. Alternatively, the entry controller 104 may determine that the new document data is detected in response to a specific event that is previously registered in the file system 130. For example, the file system 130 may be controlled to generate a specific event in response to the change in file structure of the monitor folder 132.

Still referring to FIG. 3, the distribution server 20 further includes an authorization management data storage 116. The authorization management data storage 116 stores authorization management data indicating an authorized sender that is authorized to use the document distribution function of the distribution server 20. For example, the authorization management data may indicate the authorized sender by the sender address.

When the new document data is detected, the entry controller 104 obtains a sender address that is stored with respect to the detected document data by referring to the sender address table 200, and compares the obtained sender address with the authorization management data stored in the authorization management data storage 116 to determine whether the sender who has sent the detected document data is the authorized sender.

In one example, the distribution server 20 may store the authorization management data in the authorization management data storage 116 in the form of an authorized address table 210 as illustrated in FIG. 6B. The authorized address table 210 of FIG. 6B includes a "NO. OF LICENSE" field 210a indicating the total number of licenses available for use by the document distribution system 10, a "REGISTERED IP ADDRESS" field 210b storing the registered sender address for identifying a sender who has been registered in the document distribution system 10, and an "AUTHORIZATION" field 210c storing authorization information indicating whether the registered sender is the authorized sender who is authorized to use the document distribution function.

In this example, the authorized address table 210 stores the registered sender address and the authorization information in a corresponding manner for each registered sender. In another example, the authorization information may be assigned to a machine ID, which may be obtained from the Management Information Base (MIB) of the sender through the Simple Network Management Protocol (SNMP). Assuming that the machine ID is stored with respect to the registered sender IP address, authorization of the sender may be determined by checking the authorization information of the machine ID that matches the registered sender IP address. Further, in this example, the authorization information is used to determine whether the use of entire document distribution function is authorized for each registered sender address. Alternatively, the autorotation information may be set such that authorization may be determined by flow data or by monitor folder. For example, the authorization information may be used to determine whether the use of distribution function related to specific flow data or specific monitor folder is authorized for each registered sender address. In such case, the authorization information may have a value indicating specific flow data or specific monitor folder. Alternatively, the authorization information may have a value that corresponds to the authorization level assigned to the sender of the registered IP address. Based on the authorization level value, the usage of document distribution function may be determined.

Further, in this example, the number of licenses that can be assigned by the distribution server 20 to the sender apparatus may be previously set, for example, by the administrator. According to the number of licenses previously set, the provider of the document distribution system 10 may determine how much to charge for the use of the document distribution function. For example, the number of licenses may be changed at any desired time by the administrator. The provider of the document distribution system 10 may collect information regarding the highest number of licenses obtained for a predetermined time period. The predetermined time period may be set, for example, a month or a year. Based on the collected information, the charge fee may be determined.

Alternatively, the charge fee may be determined based on the number of entries additionally registered in the authorized address table 210. For example, the provider of the document distribution system 10 may collect information regarding the highest number of registered addresses obtained from the authorized address table 210 for a predetermined time period. The predetermined time period may be set, for example, a month or a year. Based on the collected information, the charge fee may be determined. In such case, the registered IP address may be registered when the sender having the registered IP address is authorized to use the distribution function.

Further, any one of the above-described methods of determining the charge fee for the use of the document distribution function may be used in combination with the other method of determining the charge fee. For example, the charge fee may be determined based on information regarding the monitor folder such as a number of monitor folder that is registered.

In order to collect information regarding the charge fee, as described below referring to FIGS. 12 and 13, the document distribution system 10 may be additionally provided with a charger server 36 that collects information regarding the number of licenses from the image processing apparatus 20. Further, the image processing apparatus 10 may be additionally provided with any one of a charge data recorder 122, a charge data storage 124, and a charge data sender 126, each of which are described below referring to FIG. 13.

Referring to FIG. 3, when the entry controller 104 determines that the detected document data has been sent from the authorized sender, the entry controller 104 specifies flow data that corresponds to the monitor folder 132 having the detected document data stored therein. The entry controller 104 further sets the detected document data as the entered document data for further processing. Once the document data is entered, the document data may be subjected for further processing under control of the flow controller 106.

In this example, the flow data storage 114 stores therein a plurality of flow data files respectively for each monitor folder 132 of the file system 130. Since each flow data file is associated with each monitor folder 132, the user at the MFP 22 is able to cause the distribution server 20 to process the document data according to a desired distribution flow once the monitor folder is specified by the user.

FIG. 6C is a flow data table 220 storing the correspondence between a monitor folder 132 and flow data file. The flow data table 220 of FIG. 6C includes a "MONITOR FOLDER" field 220a storing the path information of the monitor folder, and a "FLOW DATA ID" field 220b storing the flow data ID for the corresponding monitor folder.

Referring to FIG. 3, when requested by the entry controller 104 to process the document data being entered, the flow controller 106 calls flow data that is specified by the entry controller 104 from the flow data storage 114. The flow controller 106 further calls a specific process in the process 108 such as the image process 112 or the distribution process 110 according to the specified flow data, and applies a set of image processing to the entered document data according to the specified flow data. At this time, the flow controller 106 may modify the flow data with the bibliographic information obtained from the bibliographic data. Assuming that the document data is to be transferred to a specified destination, the distribution process 110 is called to distribute the document data to the specified destination selected from the destinations 28 to 34.

FIG. 7 illustrates a data structure of example flow data 230. The flow data 230 of FIG. 7 describes a sequence of processes to be applied to the document data in an XML format. Referring to FIG. 7, the flow data 230 describes a flow of processes to be applied to the document data stored in the monitor folder 132. In this example, it is assumed that the document data is processed into a contract document. The flow data 230 indicates to concurrently perform a flow of applying image processing to the document data and further distributing the processed document data to a specified folder, and a flow of sending the document data via email.

More specifically, the flow data 230 of FIG. 7 includes a plurality of tags having a tree structure. The tag <ID> is a descriptor for describing a flow data ID for identifying a flow. The tag <PluginID> is a descriptor for describing a process ID for identifying a process. The value "ImageConverter" indicates application of image conversion. The value "ToFolder" indicates transfer to a folder. The value "ToEmail" indicates sending an email message. The tag <PluginType> is a descriptor for setting a type of the process, and either the output process "OutPut" or the intermediate process "filter" may be specified. The tag <Parameter> is a descriptor for setting various parameters. The tag <Parameter> may include a parameter to be input as the bibliographic item. In this example illustrated in FIG. 7, the parameter values of the bibliographic items may be entered in the sections 232, 234, 236, and 238.

Referring back to FIG. 3, a functional structure of the MFP 24 is explained according to an example embodiment of the present invention. The MFP 24 includes a specially designed scanner application 160, which provides the document distribution function.

The document distribution application 100 further includes a remote communication device 118. The remote communication device 118 communicates with the specially designed scanner application 160 of the MFP 24, and provides the document distribution function to the MFP 24. The MFP 24 may have a structure and a function substantially similar to the structure and the function described in the US Patent Application Publication No. 2008/0068638, published on Mar. 20, 2008, the disclosure of which is hereby incorporated herein by reference.

Figure 4:
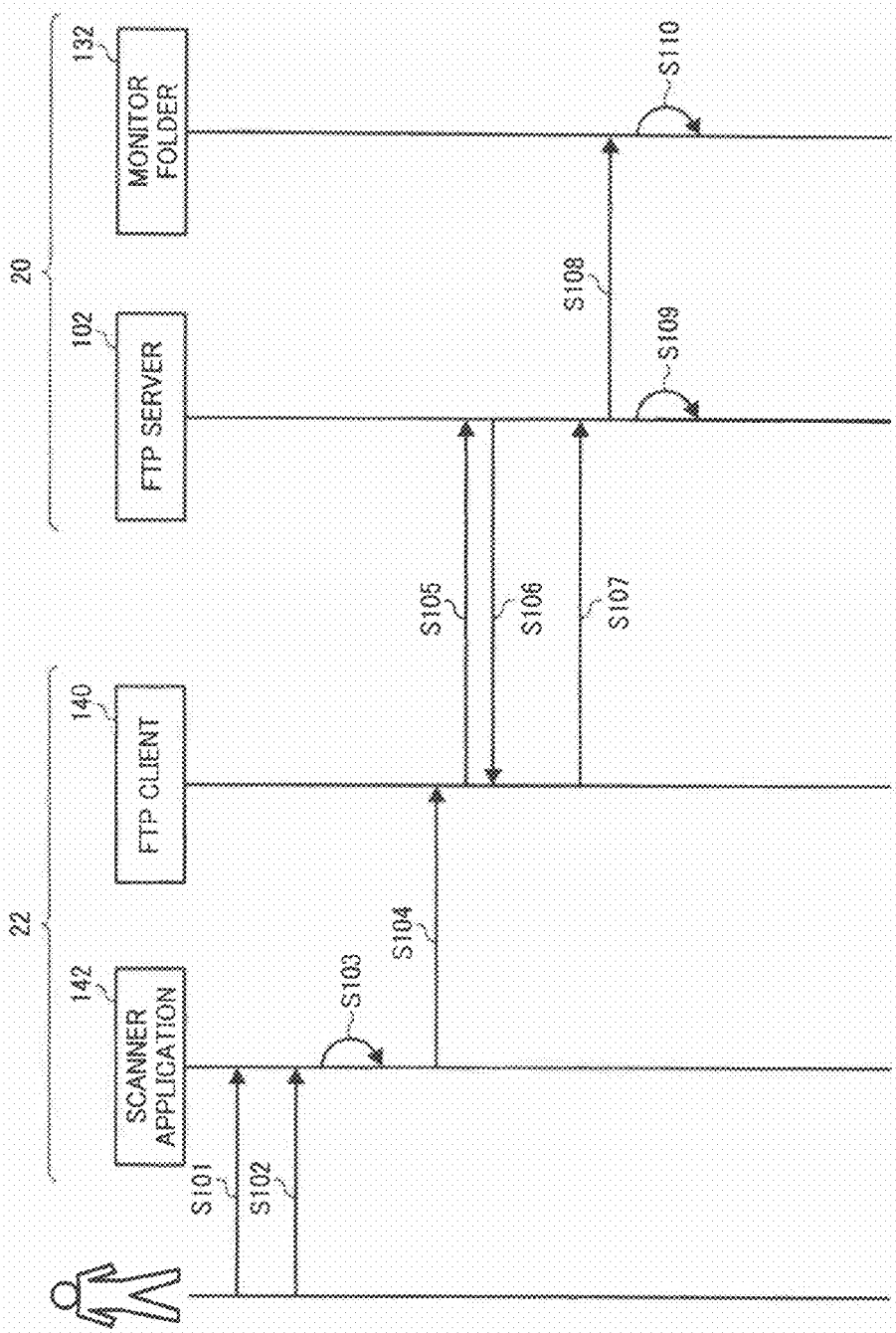
FIG. 4 is a data sequence diagram illustrating operation of distributing document data, performed by the document distribution system of FIG. 1.

Referring now to FIG. 4, operation of distributing document data, performed by the document distribution system 10 of FIG. 1, is explained according to an example embodiment of the present invention. The operation of FIG. 4 may be performed by the distribution server 20 and the MFP 22 without the document distribution function, for example, upon execution of the scanner application 142 in response to a user instruction received from the user at the MFP 22.

At S101, the scanner application 142 of the MFP 22 receives a user instruction regarding various settings for the document distribution operation, for example, from the user at the MFP 22 through a user interface such as an operation panel of the MFP 22. The settings information for the document distribution operation includes, for example, specifying a destination to which the scanned data is sent, inputting bibliographic information, and specifying various scan parameters. For the descriptive purpose, it is assumed that the monitor folder 132 of the distribution server 20 is specified as the destination.

In this example, the document data scanned from the original document and the bibliographic information may be sent separately as different data files. Alternatively, the document data of the original document and the bibliographic information may be sent together as one data file.

At S102, the scanner application 142 receives a user instruction for starting operation of distributing the document data to the destination from the user at the MFP 22, for example, through the operation panel of the MFP 22.

At S103, the scanner application 142 causes the scanner engine of the MFP 22 to read an original document into document data according to the settings information input by the user at S101.

At S104, the scanner application 142 requests the FTP client 140 to send the document data to the destination, which is specified by the user at S101.

At S105, the FTP client 140 sends a connection request to the FTP server 102 of the distribution server 20 according to the FTP protocol.

At S106, the FTP server 102 of the distribution server 20 sends a connection response to the FTP client 140 of the MFP 22. For example, when the passive FTP is used, the FTP server 102 selects a port number for data transfer, and sends information regarding the selected port number to the FTP client 140 to establish connection through the defined port.

At S107, the FTP client 140 of the MFP 22 sends the document data to the FTP server 102. At this time, the FTP client 140 may send bibliographic data generated for the document data to the FTP server 102. FIG. 8A illustrates an example data structure of the bibliographic data 240 in which the bibliographic information input through the MFP 22 is described. The bibliographic data 240 stores a plurality of parameter values respectively for a plurality of bibliographic items. In this example illustrated in FIG. 8A, the bibliographic data 240 includes the value "20090304" for the date bibliographic item, and the value "Suzuki" for the user name bibliographic item.

Referring back to FIG. 4, at S108, the FTP server 102 of the distribution server 20 requests the file system 130 to store the document data in the monitor folder 132.

At S109, the FTP server 102 stores the sender address information for identifying a sender address, and path information specifying the location at which the document data is stored, in a corresponding manner in the sender address table 200.

At S110, the monitor folder 132 stores the document data, and the operation ends.

Figure 5:
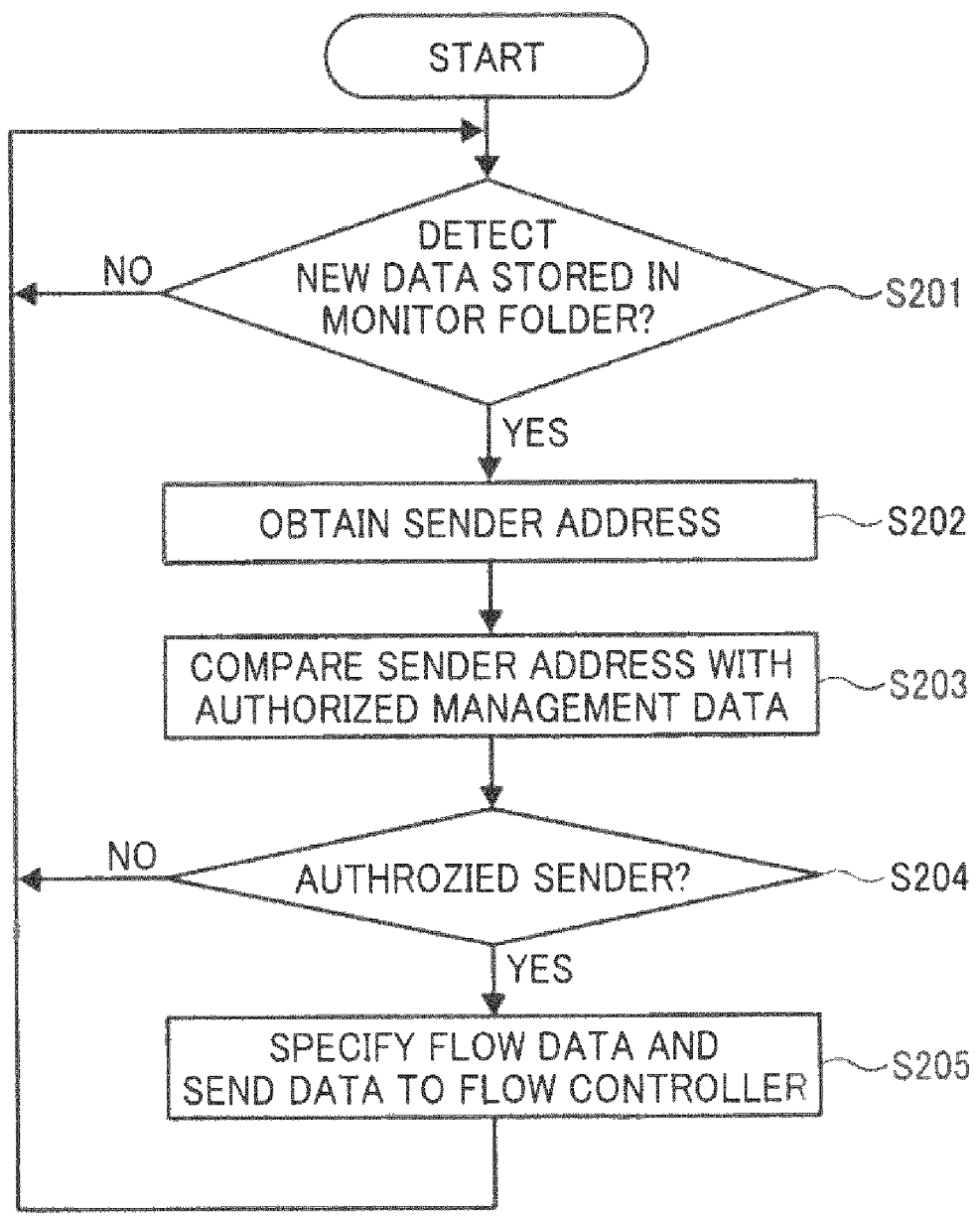
FIG. 5 is a flowchart illustrating operation of managing document data, performed by the distribution server of FIG. 3.

Referring to FIG. 5, operation of controlling the entry of the document data is explained according to an example embodiment of the present invention. The operation of FIG. 5 may be performed by the entry controller 104, for example, upon execution of the document distribution application 100 of the distribution server 20.

At S201, the entry controller 104 determines whether registration of new document data in the monitor folder 132 is detected. When it is determined that registration of new document data in the monitor folder 132 is detected ("YES" at S201), the operation proceeds to S202. When it is determined that registration of new document data in the monitor folder 132 is not detected ("NO" at S201), the operation repeats S201.

At S202, the entry controller 104 obtains sender address information regarding a sender that has sent the detected document data from the sender address table 200. In this example, the sender IP address is used as the sender address information.

At S203, the entry controller 104 compares the obtained sender address information with the authorization management data stored in the authorization management data storage 116.

At S204, the entry controller 104 searches through the authorization management data stored in the authorization management data storage 116 for a registered sender IP address that matches the obtained sender IP address, and determines whether the sender having the searched registered sender IP address is authorized. When it is determined that the sender is authorized ("YES" at S204), the operation proceeds to S205. When it is determined that the sender is not authorized ("NO" at S204), the operation ends to repeat Step S201 to determine whether new document data is detected.

At S205, the entry controller 104 specifies the flow data that corresponds to the monitor folder 132, and enters the detected document data as the document data to be processed using the document distribution function. The entry controller 104 passes the bibliographic information for the detected document data to the flow controller 106, and the operation ends to repeat S201 to determine whether new document data is detected.

The flow controller 106 receives the entered document data from the entry controller 104 for further processing. The flow controller 106 modifies the specified flow data with the bibliographic information obtained from the bibliographic data, and applies one or more processes to the document data. FIG. 8B illustrates a data structure of the flow data 250, which is generated by modifying the flow data 230 of FIG. 7 with the bibliographic data 240 of FIG. 8A. In this example illustrated in FIG. 8B, the flow data 250 includes a plurality of sections 252, 254, 256 and 258 having the contents being modified with the respective bibliographic items of the bibliographic data 240.

In the above-descried example, the document data that has been sent from the unauthorized sender may be kept in the monitor folder 132. Alternatively, the document data that has been sent from the unauthorized sender may be deleted at any desired time, for example, immediately after it is determined that the sender is unauthorized or when a predetermined time period passes after it is determined that the sender is unauthorized.

Referring to FIG. 3, operation of managing the authorization management data is explained. The document distribution application 100 further includes an authorization manager 120. The authorization manager 120 provides a user interface to the administrator at the distribution server 20, which allows the administrator of the system 10 to manage the input apparatus registered as the authorized sender, for example, by adding, changing, or deleting the registered address information of the input apparatus.

For example, the authorization manager 120 may be implemented by a web server application. In such case, the management tool 150 of the management terminal 26 may be implemented by a web browser. In one example, the authorization manager 120 receives a request for obtaining a web page for providing a user interface according to the HTTP, from the web browser of the management terminal 26. In response to the request, the authorization manager 120 sends a management screen to the web browser of the management terminal 26. In another example, the authorization manager 120 receives a HTTP request including settings information input by the user, and modifies the authorization management data such as the authorized data table 210 of FIG. 6B with the received settings information.

FIG. 9 illustrates an example management screen 300 provided by the authorization manager 120. The management screen 300 of FIG. 9 is a screen for allowing the administrator to register a registered sender IP address of the authorized MFP. The management screen 300 includes a "REGISTER" button 302, "CANCEL" button 304, "ADD" button 310, "EDIT" button 312, and "DELETE" button 314. When the "REGISTER" button 302 is selected, the settings information input through the management screen 300 is reflected to the authorization management data stored in the authorization management data storage 116. The "CANCEL" button 304 allows the administrator to cancel the settings information made through the management screen 300. The screen 300 further includes a box 306 for displaying therein an address of the registered authorized sender. The "ADD" button 310 may be selected to additionally register a specific sender address as the registered sender address. The "EDIT" button 312 may be selected to change the value of the registered authorized sender address that has been selected from the box 306, for example, due to the address change. The "DELETE" button 314 may be selected to delete the registered authorized sender address that has been selected from the box 306. In the example illustrated in FIG. 9, "xxx.xxx.xxx.xx5" 308 is selected.

The authorization manager 120 may be provided with an access control function for restricting the access to the management screen 300. For example, the access may be controlled using the BASIC authentication, the DIGEST authentication, the Lightweight Directory Access Protocol (LDAP) authentication, biographic authentication such as fingerprint or vein authentication, etc.

Referring now to FIGS. 10A and 10B, operation of setting a monitor folder is explained according to an example embodiment of the present invention. FIG. 10A illustrates a monitor folder management screen. FIG. 10B illustrates a fee table 260.

The monitor folder management screen 320 is a screen for allowing the administrator to register the monitor folder 132. The monitor folder management screen 320 includes a "REGISTER" button 322, "CANCEL" button 324, "ADD" button 330, "EDIT" button 332, and "DELETE" button 334. The "REGISTER" button 322 may be selected to reflect various settings made through the monitor folder management screen 320. The "CANCEL" button 324 may be selected to cancel various settings made through the monitor folder management screen 320. The monitor folder management screen 320 further includes a box 326 for displaying therein information regarding the registered monitor folder including a path of the monitor folder, a name of the work flow made in association with the monitor folder, and the monthly fee calculated for the monitor folder.

The "ADD" button 330 may be selected to additionally register the monitor folder. The "EDIT" button 332 may be selected to change the settings regarding the registered monitor folder that has been selected from the box 326. The "DELETE" button 334 may be selected to delete the registered monitor folder that has been selected from the box 326. The work flow name may be previously set in association with the flow data. In the example illustrated in FIG. 10A, the monitor folder having the path "C:¥ftp¥folder3" is selected.

The monthly charge fee, or the unit charge fee, may be determined to be fixed. In this example, it is assumed that the monthly fee is calculated using the fee table 260 of FIG. 10B. More specifically, information regarding the plugin registered in the flow data, such as the number of types of plugins and the number of plugins, is collected for each monitor folder. Once information regarding the plugin registered in the flow data is obtained, the unit fee to be charged for the document data entered in the monitor folder can be calculated using the fee table 260 of FIG. 10B. In the example illustrated in FIG. 10B, the fee table includes a "PluginID" field storing the process ID information for identifying a process, and a "FEE" field including a unit fee for each process. The unit fee previously set in association with each process may be determined to be fixed or may be determined to increase step by step. The obtained information regarding the unit fee calculated for each monitor folder may be stored and used to charge the user of the document distribution system 10.

The monitor folder management screen 320 may be implemented by a web application. For example, when the "ADD" button 330 of the monitor folder management screen 320 is selected through the management tool 26, the management terminal 26 is caused to display a dialog that allows the administrator to input the path of the monitor folder and select a work flow that is made in association with the monitor folder. The management terminal 26 sends settings information input through the dialog to the distribution server 20. According to the settings information, the distribution server 20 calculates the unit fee for the monitor folder, and updates the monitor folder management screen 320. When the "REGISTER" button 322 is selected, the distribution server 20 modifies the flow data table 220 of FIG. 6C with the settings information.

In order to allow the management germinal 26 to display a user interface such as the management folder management screen 320 provided by the image processing apparatus 20, the image processing apparatus 20 may be additionally provided with a flow data manager. The flow data manager may function in a substantially similar manner as described for the case of the authorization manager 120. The function of the flow data manager may be collectively performed by the authorization manager 120. In such case, the authorization manager has access to the flow data 114 in addition to the access ("indicated by the arrow in FIG. 13") to the authorization management data 116.

As described above, even when the MFP 22 is not installed with the specially designed application, the distribution server 20 recognizes the MFP 22 as the authorized sender as long as the MFP 22 has been registered and stored using the authorization management data stored in the authorization management data storage 116. In order to process the document data according to a desired work flow, the user at the MFP 22 simply sends the document data to a monitor folder that is made in association with the desired work flow. The document distribution application 100 includes the authorization manager 120. When a license is additionally bought, the administrator may set any desired MFP to have the newly obtained license. With the license, any MFP may have the document distribution function. The administrator may determine whether to authorize a specific input apparatus to allow the specific input apparatus to have the document distribution function. Further, the charge fee may be determined according to a number of licenses, a number of registered sender addresses, a number of monitor folders, etc.

In the above-described example, the distribution server 20 and the MFP are separately provided as different apparatuses. Alternatively, the MFP may be additionally provided with the distribution server function depending on the number of MFPs to be managed by the distribution server 20 or the capability of the MFP. For example, as illustrated in FIG. 11, a MFP 400 may be provided, which additionally provides the distribution server function.

Figure 11:
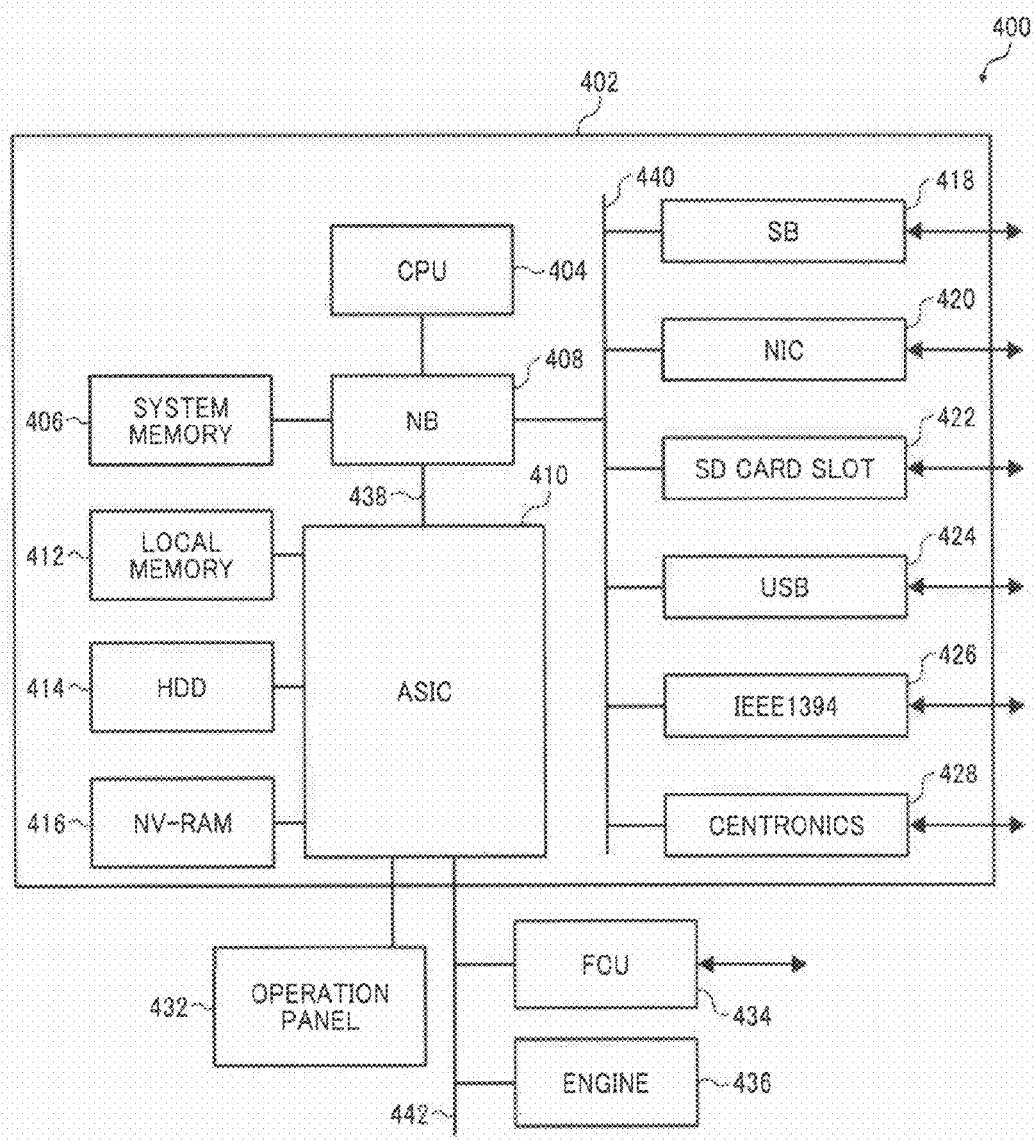
FIG. 11 is a hardware structure of a distribution server of the document distribution system of FIG. 1, according to an example embodiment of the present invention.

Referring to FIG. 11, the MFP 400 includes a controller 402, an operation panel 432, a facsimile control unit (FCU) 434, and an engine 436. The controller 402 includes a central processing unit (CPU) 404, a north bridge (NB) 408, an ASIC 410 connected to the CPU 404 through the NB 408, and a system memory 406. The ASIC 410 is connected to the NB 408 via an Accelerated Graphic Port (AGP), and applies various image processing. The system memory 406 may be used as a drawing memory area.

The ASIC 410 is connected to a local memory 412, a hard disk drive (HDD) 414, a non-volatile memory (NV-RAM) 416 such as a flash memory. The local memory 412 may be used as a copy image buffer or a code buffer. The HDD 414 may store various data including, for example, image data, document data, program, font data, and form data. The HDD 414 may provide a memory area in which the monitor folder is stored. The NV-RAM 416 stores therein a control program for controlling the MFP 400, various system data, and various settings data.

The controller 402 further includes a south bridge (SB) 418, a network interface card (NIC) 420, a secure digital (SD) card slot 422, a USB interface 424, an IEEE 1394 interface 426, and a Centronics interface 428, each of which are connected to the NB 408 through a PCI bus 440. The SB 418 connects the NB 408 with a peripheral device such as a ROM or PCI bus peripheral bus. The NIC 420 is an interface device, which allows the MFP 400 to connect to a network such as the Internet or a local area network (LAN). The NIC 420 may receive a user instruction from the network. Into the SD card slot 422, a removable medium such as a SD card may be inserted. The USB interface 422, the IEEE 1394 interface 426, and the Centronics interface 428 may each receive a printing job according to the standard.

The operation panel 432 is connected to the ASIC 410 of the controller 402, and functions as a user interface which receives a user input from the user or displays a screen to the user. The FCU 434 and the engine 436 are each connected to the ASIC 410 through a PCI bus 442. The FCU 434 allows the MFP 400 to communicate according to the facsimile communication standard such as the G3 or G4. The engine 436 receives an instruction issued by an application to perform operation according to the received instruction. For example, the engine 436 may perform image forming operation when an instruction for printing is received. In another example, the engine 436 may perform reading operation when an instruction for scanning is received.

The CPU 404 reads a program from a desired memory such as the NVRAM 416, the HDD 414, or the SDD card, and loads the read program onto a memory area of the system memory 406. Under the operating system (OS), the CPU 404 causes the MFP 400 to function as the distribution server 20 having the functional structure described above referring to FIG. 3. Further, in this example, any one of the MFP 22 and MFP 24 may have a hardware structure substantially similar to the hardware structure illustrated in FIG. 11.

In the example illustrated in FIG. 11, the MFP is implemented as a multifunctional apparatus capable of performing the facsimile function, printer function, and scanner function. Alternatively, the MFP may be implemented as a scanner apparatus or a facsimile apparatus.

Figure 12:
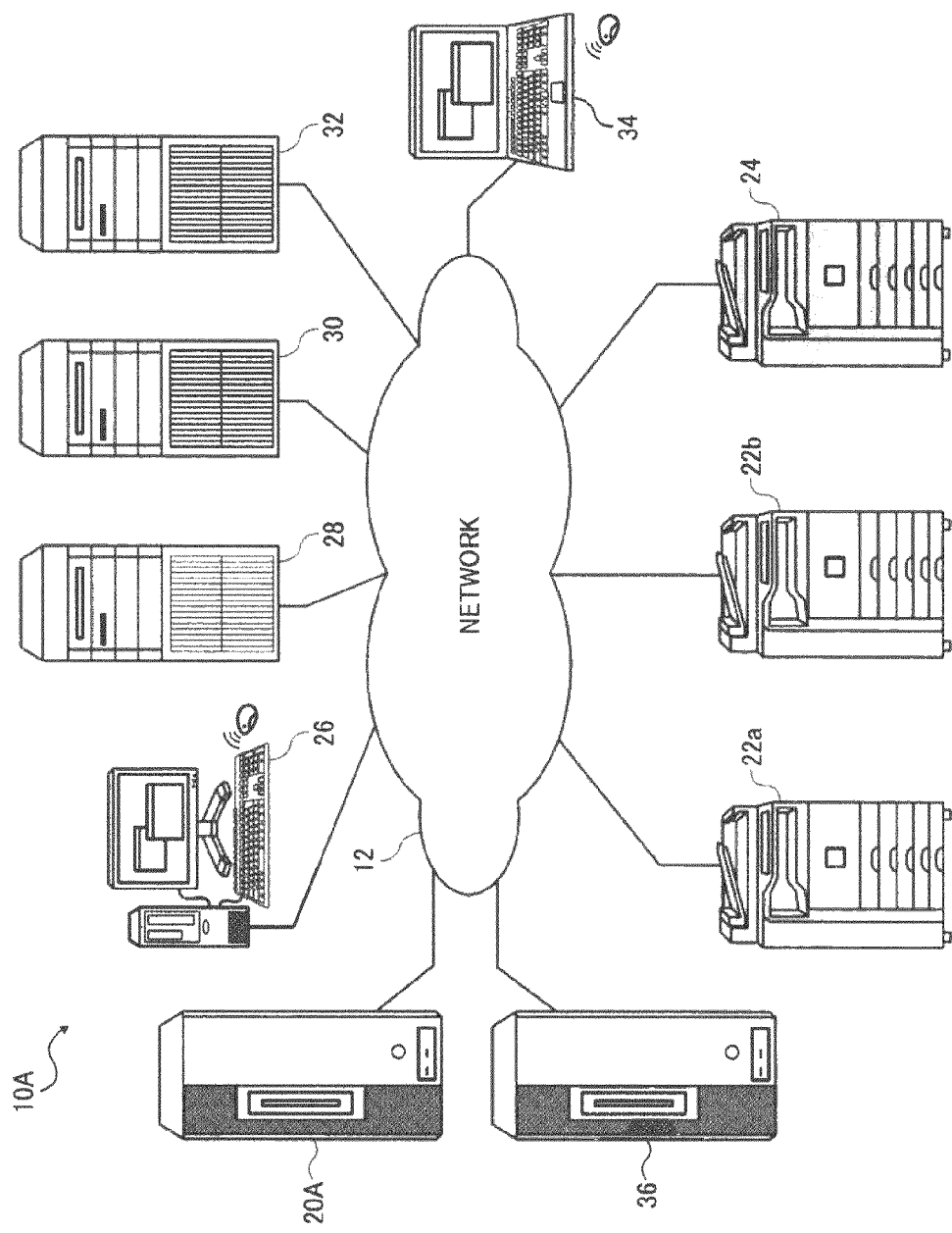
FIG. 12 is a configuration of a document distribution system according to an example embodiment of the present invention.

Referring now to FIG. 12, a configuration of a document distribution system 10A is explained according to an example embodiment of the present invention. The document distribution system 10A of FIG. 12 is substantially similar in structure and function to the document distribution system 10 of FIG. 1. The differences include the addition of a charge server 36, and the replacement of the distribution server 20 with a distribution server 20A. The document distribution system 10A is capable of managing a charge fee based on the number of document data that has been set for distribution management.

The charge server 36 collects charge data specifying the fee charged to the user according to the usage of the document distribution system 10A. The distribution server 20A receives document data from the MFP 22 without the document distribution function. When the sender of the document data is authorized, the distribution server 20A applies a set of image processing according to a predetermined distribution flow. Further, the distribution server 20A records a log of the document data being entered, and reports the charge server 36. In this example illustrated in FIG. 12, the charge server 36 is separately provided from the distribution server 20A. Alternatively, the charge server 36 may be provided in the distribution server 20A.

Figure 13:
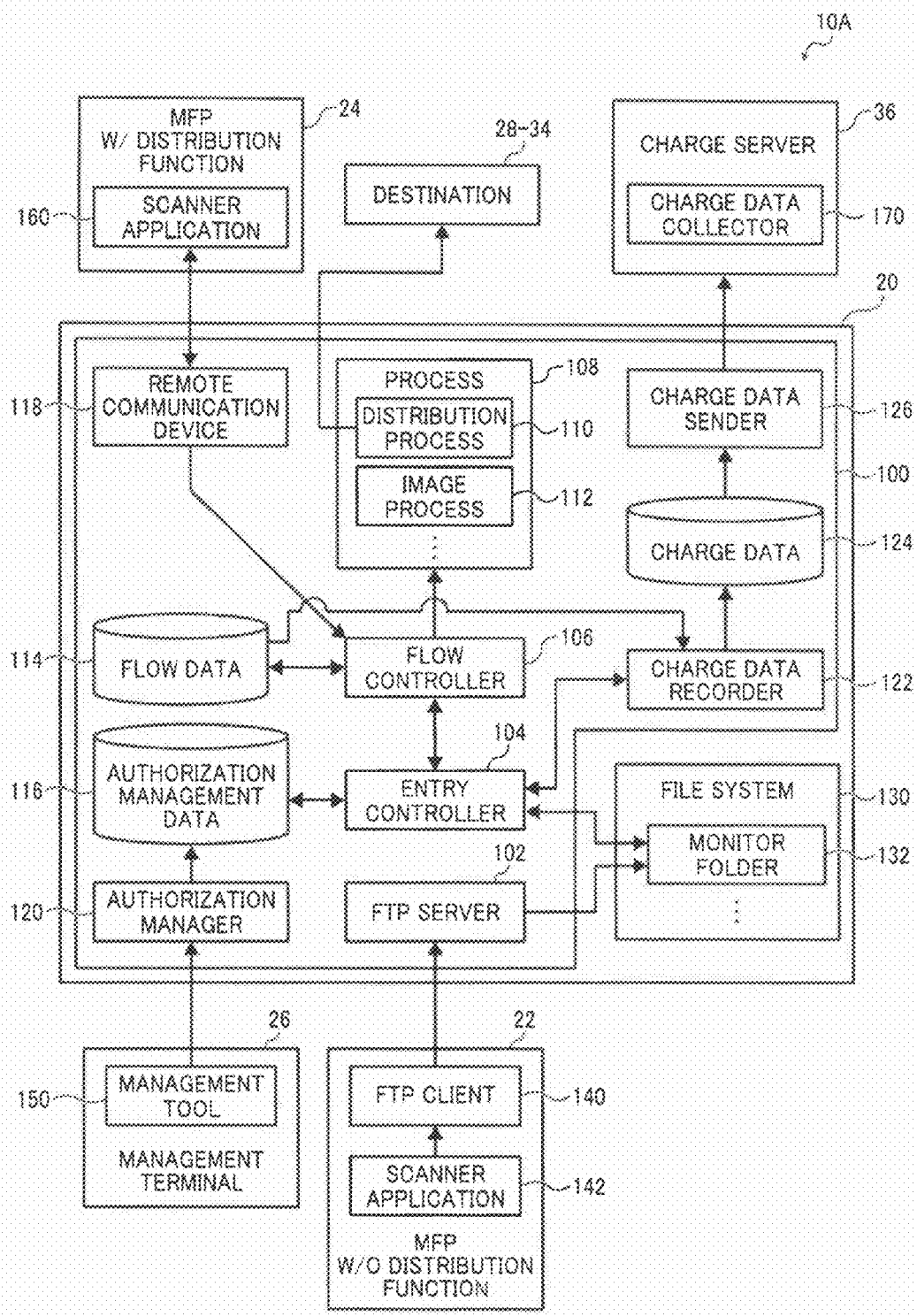
FIG. 13 is a functional structure of the document distribution system of FIG. 12.

Referring to FIG. 13, a functional structure of the document distribution system 10A is explained according to an example embodiment of the present invention. The document distribution system 10A is substantially similar in structure and function to the document distribution system 10 of FIG. 3, except for the addition of the charge server 36 and the replacement of the distribution server 20 with the distribution server 20A. The distribution server 20A is substantially similar in structure and function to the distribution server 20 of FIG. 3, except for the addition of a charge data recorder 122, a charge data storage 124, and a charge data sender 126.

The entry processor 104 monitors input or output of a document data file with respect to the monitor folder 132. When the document data which has been sent from the authorized sender is stored in the monitor folder 132, the entry controller 104 specifies flow data that corresponds to the monitor folder 132 storing the document data therein. The entry controller 104 further enters the document data to be processed by the flow controller 106, and requests the flow controller 106 to apply processing to the document data. When the request is received, the flow controller 106 calls the specified flow data in the flow data storage 114, and applies one or more processes that have been specified to the document data. When all processes are completed, the flow controller 106 notifies the entry controller 104 that the processes are completed.

Upon notification, the entry controller 104 notifies the charge data recorder 122 that the entry of the document data has been completed as well as information regarding the ID of the specified flow data. The charge data recorder 122 reads the flow data having the ID notified from the entry controller 104, and calculates the charge fee for completing one job using the fee table 260 of FIG. 10B. The calculated charge fee is stored as charge data in the charge data storage 124. The charge data stored in the charge data storage 124 indicates a fee that has been charged for performing one job of applying a sequence of processes to the document data.

FIG. 15 illustrates a charge data table 270 storing the charge data. The charge data table 270 of FIG. 17 includes a "INDEX NO." field 270a storing the index number uniquely assigned to each entry of charge data, a "TIME PROCESSED" field 270b storing the date or time the document data is processed, a "MONITOR FOLDER" field 270c storing path information of the monitor folder, a "FLOW DATA ID" field 270d storing the flow data ID, a "CHARGE FEE" field 270e storing the charge fee, and a "CLIENT ID" field 270f storing a client ID for identifying the user of the document distribution system who has instructed to perform a specific job. With the charge data table 270, the charge fee is easily maintained by a specific job. This improves operability for the user of the document distribution system as it is sometimes easier to manage the charge fee by a specific job, rather than information that is collected over a certain time period.

The charge fee of the field 270e may be calculated according to the processes registered in the flow data using the fee table 260 of FIG. 10B. Alternatively, the charge fee of the field 270e may be calculated in various other ways, for example, based on the characteristics of the document data in addition or in alternative to the contents of the flow data. The characteristics of the document data includes whether the document data is monochrome or color, the number of pages in the document data, the resolution, and the number of destinations to which the email data is addressed.

The charge data sender 126 may send the charge data accumulated in the charge data storage 124 to the charge server 36 at any desired time. The desired time may be a predetermined time that has been periodically set or scheduled, or a timing when a predetermined number of entries has been stored in the charge data storage 124. The charge data collector 170 of the charge server 36 collects the charge data from a plurality of apparatuses including the distribution server 20A to manage the collected charge data.

Figure 14:
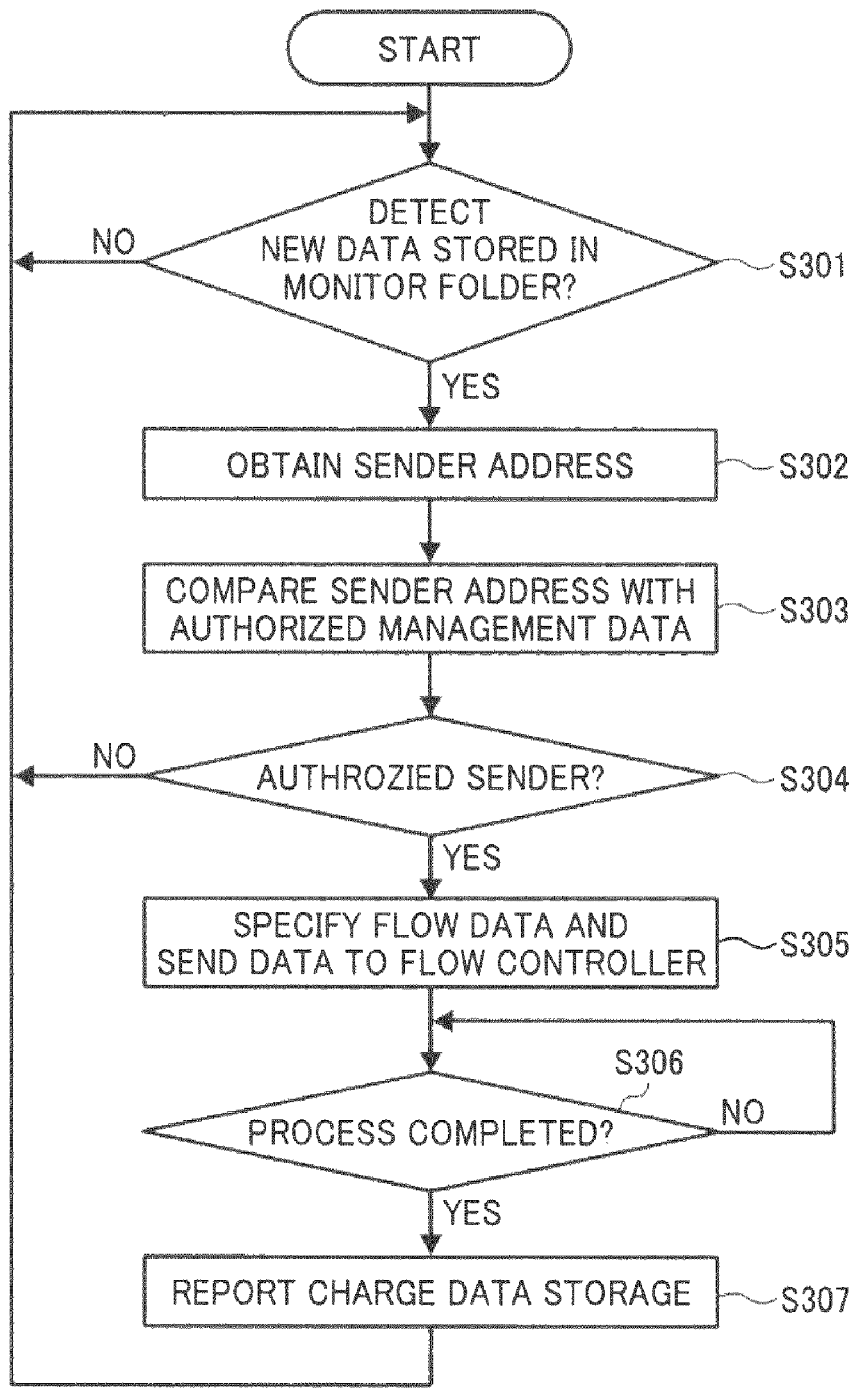
FIG. 14 is a flowchart illustrating operation of managing document data, performed by the distribution server of FIG. 13.

Referring to FIG. 14, operation of managing document data is explained according to an example embodiment of the present invention. The operation of FIG. 14 may be performed by the entry controller 104 of the distribution server 20A upon execution of the document distribution application 100.

At S301, the entry controller 104 determines whether registration of new document data in the monitor folder 132 is detected. When it is determined that registration of new document data in the monitor folder 132 is detected ("YES" at S301), the operation proceeds to S302. When it is determined that the registration of new document data in the monitor folder 132 is not detected ("NO" at S301), the operation repeats 5301.

At S302, the entry controller 104 obtains sender address information regarding a sender that has sent the detected document data from the sender address table 200. In this example, the sender IP address is used as the sender address information.

At S303, the entry controller 104 compares the obtained sender address information with the authorization management data stored in the authorization management data storage 116.

At S304, the entry controller 104 searches through the authorization management data stored in the authorization management data storage 116 for a registered sender IP address that matches the obtained sender IP address, and determines whether the sender having the searched registered sender IP address is authorized. When it is determined that the sender is authorized ("YES" at S304), the operation proceeds to S305. When it is determined that the sender is not authorized ("NO" at S304), the operation ends to repeat Step S301 to determine whether new document data is detected.

At S305, the entry controller 104 specifies the flow data that corresponds to the monitor folder 132, and enters the detected document data as the document data to be processed using the document distribution function. The entry controller 104 passes the bibliographic information for the detected document data to the flow controller 106, and waits for notification from the flow controller 106. While waiting for notification from the flow controller 106, the operation may return to S301 to determine whether new document data is detected.

At S306, the entry controller 104 determines whether notification from the flow controller 106 is received. The notification indicates that the detected document data is successfully processed and distributed to a destination. When it is determined that notification is received to indicate completion of the process ("YES" at S306), the operation proceeds to S307. When it is determined that notification is not received ("NO" at S306), the operation repeats S306.

At S307, the entry controller 104 sends notification to the charge data recorder 122, which indicates completion of the document distribution operation together with information regarding the flow data that corresponds to the monitor folder, and ends the operation to return to S301 to determine whether new document data is detected.

When notification is received from the entry controller 104, the charge data recorder 122 calculates the charge fee based on information regarding the flow data, and stores information regarding the charge fee.

As described above referring to FIG. 14, even when the MFP is not installed with the specially designed scanner application 160, the distribution server 20A is able to calculate a charge fee based on the use of the document distribution function by the MFP. More specifically, when the entry controller 106 determines that the MFP that has sent new document data to the monitor folder 132 is the authorized sender, the entry controller 106 sends notification to the charge data recorder 122. Once notified, the charge data recorder 122 is able to calculate the charge fee, for example, based on the number of document data files stored in the monitor folder 132 by the sender or based on information regarding the flow data selected for the monitor folder 132. In this manner, the provider of the document distribution system 10A can obtain a charge fee that accurately reflects the use of the document distribution function by specific sender or by document data.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. The computer program may be written, for example, in legacy programming language or object oriented programming language, such as assembler, C, C++, C#, Java, etc. Examples of storage mediums include, but are not limited to, flexible disk, flash memory, hard disk, optical discs such as CD-ROM, CD-RW, DVD-ROM, DVD-RAM, DVD-RW, blue-ray disc, magneto-optical discs, magnetic tapes, involatile memory cards, ROM (read-only-memory), EEPROM, EPROM, SD card, etc. Alternatively, at least one component of the computer program may be distributed through a network.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in: an image processing apparatus to connect to a network. The image processing apparatus includes: a data storage device to obtain image data from an image input apparatus through the network and store the obtained image data in association with sender identification information of the image input apparatus; a memory device to store authorization management data that associates registered identification information and authorization information; an entry controller device to determine whether the image input apparatus is authorized by referring to the registered identification information that matches the sender identification information when storing of the image data at a storage area subjected for monitoring is detected, and to enter the image data for further processing when it is determined that the image input apparatus is authorized; and a flow controller to control application of one or more processes to the entered image data according to flow data defining a sequence of the one or more processes.

In the above-described example, the image processing apparatus further includes a storage device to store charge data calculated based on the storage area subjected for monitoring that corresponds to identification information of the flow data.

For example, the charge data may be calculated based on a number of storage areas subjected for monitoring or based on the contents in the flow data that corresponds to the storage area subjected for monitoring. For example, the charge data may be calculated for a predetermined time period or for the entered image data. Alternatively, the charge data may be generated every time the one or more processes are applied to the entered image data.

In the above-described example, the data storage device obtains bibliographic data related to the image data from the image input apparatus. The flow controller modifies the flow data using the obtained bibliographic data.

In the above-described example, the image processing apparatus further includes: a device to generate screen data that defines a management screen that allows a user to change the registered identification information of the authorization management data and the authorization information that is set with respect to the registered identification information; and a device to modify the authorization management data based on the change input through the management screen.

For example, the authorization information may determine whether the registered sender is authorized to use the entire document distribution function, which may be referred to as flow control function. Alternatively, the authorization information may determine whether the registered sender is authorized to use the document distribution function based on the storage area subjected for monitoring. For example, the authorization management data includes data that associates apparatus identification information for identifying the image input apparatus and the registered identification information, and data that associates the apparatus identification information and the authorization information. The flow data may be associated with the storage area subjected for monitoring.

In the above-describe example, the one or more processes defined by the flow data includes at least one of: a distribution process; an image processing process; and an output process.

In the above-described example, the output process includes at least one of: web distribution process; folder transfer process; and email distribution process.

In the above-described example, the image processing apparatus may be implemented by a server apparatus that is separately provided. Alternatively, the image processing apparatus and the image input apparatus may be integrated into one apparatus.

In another example, the present invention may reside in: a system including an image processing apparatus and an image input apparatus to connect to the image processing apparatus via a network. The image input apparatus includes an image input device to input the image data; and a data transfer device to send the image data after specifying a storage area in which the image data is stored. The image processing apparatus includes: a data storage device to obtain image data from an image input apparatus through the network and store the obtained image data in association with sender identification information of the image input apparatus; a memory device to store authorization management data that associates registered identification information and authorization information; an entry controller device to determine whether the image input apparatus is authorized by referring to the registered identification information that matches the sender identification information when storing of the image data at a storage area subjected for monitoring is detected, and to enter the image data for further processing when it is determined that the image input apparatus is authorized; and a flow controller to control application of one or more processes to the entered image data according to flow data defining a sequence of the one or more processes.

In the above-described example, the image processing apparatus further includes a storage device to store charge data calculated based on the storage area subjected for monitoring that corresponds to identification information of the flow data.

In the above-described example, the image input apparatus includes a device to generate bibliographic data related to the image data. The data storage device of the image processing apparatus obtains the bibliographic data related to the image data from the image input apparatus. The flow controller of the image processing apparatus modifies the flow data using the obtained bibliographic data.

In the above-described example, the image input apparatus may input the image data by scanning an original document into the image data or receiving facsimile data. The image input apparatus may send the image data to the storage area in the image processing apparatus, which is specified as a destination to which the image data is sent.

In another example, the present invention may reside in: an image processing method performed by an image processing apparatus to connect to a network. The image processing method includes: obtaining image data from an image input apparatus through the network; storing the obtained image data in association with sender identification information of the image input apparatus; reading out authorization management data that associates registered identification information and authorization information and referring to the registered identification information that matches the sender identification information when storing of the image data at a storage area subjected for monitoring is detected; entering the image data for further processing when it is determined that the image input apparatus is authorized; and controlling application of one or more processes to the entered image data according to flow data defining a sequence of the one or more processes.

In the above-described example, the image processing method further includes: storing charge data calculated based on the storage area subjected for monitoring that corresponds to identification information of the flow data.

In the above-described example, the image processing method further includes: obtaining bibliographic data related to the image data from the image input apparatus; and modifying the flow data using the obtained bibliographic data.

In the above-described example, the image processing method further includes: generating screen data that defines a management screen that allows a user to change the registered identification information of the authorization management data and the authorization information that is set with respect to the registered identification information; and modifying the authorization management data based on the change input through the management screen.

Any one of the above-described methods may be practiced as a computer executable program or a recording medium storing therein the computer executable program.

With the above-described structure, even when the image input apparatus is not installed with a specially designed application, as long as the sender identification information of the image input apparatus has been registered in the authorization management data as the registered sender identification information, the image processing apparatus determines that the image input apparatus is authorized to use the document distribution function and enters the image data sent from the image input apparatus to be processed according to flow data. The user at the image input apparatus instructs the image input apparatus to send the image data to a storage area subjected for monitoring that corresponds to a distribution flow specified by the user. As long as the image input apparatus is registered as the authorized sender, the user at the image input apparatus is not required to perform further processing to use the document distribution function of the image processing apparatus to apply one or more processes defined by the specified distribution flow.

In another example, the present invention may reside in: an image processing method performed by an image processing apparatus to connect to an image input apparatus through a network, the method including: storing image data sent from the image input apparatus through the network in a specific storage area; storing sender identification information for identifying the image input apparatus in association with the obtained image data; storing authorization management data that associates registered sender identification information for identifying a registered image input apparatus and authorization information indicating whether the registered image input apparatus is an authorized sender; monitoring the specific storage area to detect whether the image data is stored in the specific storage area; determining whether the image input apparatus is the authorized sender by referring to the authorization information of the registered image input apparatus that matches the sender identification information of the image input apparatus to generate a determination result when storing of the image data in the specific storage area is detected; entering the image data for further processing according to the determination result indicating that the image input apparatus is the authorized sender; obtaining flow data defining a sequence of one or more processes; and applying the sequence of one or more processes to the entered document data according to the flow data.

In the above-described example, the image processing method may further include: calculating a charge fee using a number of entries of the registered sender identification information.

In the above-described example, the image processing method may further include: storing information regarding a number of licenses available for use by the image processing apparatus as the authorization management data; and calculating a charge fee using the information regarding the number of licenses.

In the above-described example, the image processing method may further include: storing data that associates a plurality of flow data files and a plurality of specific storage areas, wherein the flow data for the image data being obtained is one of the plurality of flow data files that is made in association with one of the specific storage areas that matches the specific storage area storing the image data therein; and calculating a charge fee using at least one of information regarding the plurality of flow data files and information regarding the plurality of specific storage areas.

In the above-described example, the image processing method may further include: sending notification indicating that application of one or more processes to the image data is completed; and calculating a charge fee using information regarding the flow data that matches the specific storage area.

In the above-described example, the image processing method may further include: storing the calculated charge fee together with information regarding a job of applying the sequence of one or more processes to the image data.

In the above-described example, the image processing method may further include: providing a user interface that allows a user to manage the authorization management data.

In the above-described example, the image processing method may further include: storing bibliographic data obtained from the image input apparatus; and modifying the obtained flow data using information of the bibliographic data.

In the above-described example, the one or more processes defined by the flow data includes at least one of: process of filtering; process of applying image processing; and process of outputting the image data or distributing the image data to a desired destination using a desired communication interface.

In another example, any one of the above-described image processing method may be stored in any desired recording medium.

What is claimed is:

1. An image processing apparatus configured to connect to an image input apparatus through a network, the apparatus comprising:
    an image data obtaining device configured to store image data sent from the image input apparatus through the network in a specific storage area and to store sender identification information for identifying the image input apparatus in association with the obtained image data;
    an authorization management data storage device configured to store authorization management data that associates registered sender identification information for identifying a registered image input apparatus and authorization information indicating whether the registered image input apparatus is an authorized sender;
    an entry controller device configured to monitor the specific storage area to detect whether the image data is stored in the specific storage area, to determine whether the image input apparatus is the authorized sender by referring to the authorization information of the registered image input apparatus that matches the sender identification information of the image input apparatus to generate a determination result when storing of the image data in the specific storage area is detected, and to enter the image data for further processing according to the determination result indicating that the image input apparatus is the authorized sender; and
    a flow controller device configured to obtain flow data defining a sequence of one or more processes, and to apply the sequence of one or more processes to the entered image data according to the flow data.

2. The image processing apparatus of claim 1, further comprising:
    a charge data recorder device configured to calculate a charge fee using a number of entries of the registered sender identification information stored in the authorization management data storage device.

3. The image processing apparatus of claim 2, wherein the authorization management data storage device further stores information regarding a number of licenses available for use by the image processing apparatus, and
    the charge data recorder device is configured to calculate a charge fee using the information regarding the number of licenses.

4. The image processing apparatus of claim 1, further comprising:
    a flow data storage device configured to store data that associates a plurality of flow data files and a plurality of specific storage areas, wherein the flow controller device obtains one of the plurality of flow data files that is made in association with one of the specific storage areas that matches the specific storage area storing the image data therein as the flow data for the image data; and
    a charge data recorder device configured to calculate a charge fee using at least one of information regarding the plurality of flow data files and information regarding the plurality of specific storage areas.

5. The image processing apparatus of claim 4, wherein:
    the entry controller device is further configured to send notification indicating that application of the sequence of one or more processes to the image data is completed, and
    the charge data recorder device is further configured to calculate a charge fee using information regarding the flow data that matches the specific storage area.

6. The image processing apparatus of claim 5, further comprising:
    a charge data storage device configured to store the charge fee calculated by the charge data recorder device together with information regarding a job of applying the sequence of one or more processes to the image data.

7. The image processing apparatus of claim 1, further comprising:
    an authorization manager device configured to provide a user interface that allows a user to manage the authorization management data stored in the authorization management data storage device.

8. The image processing apparatus of claim 1, wherein:
    the image data obtaining device is further configured to obtain bibliographic data from the image input apparatus and store the bibliographic data, and
    the flow controller device is configured to modify the obtained flow data using information of the bibliographic data.

9. The image processing apparatus of claim 1, wherein the one or more processes defined by the flow data includes at least one of:
    process of filtering;
    process of applying image processing; and
    process of outputting the image data or distributing the image data to a desired destination using a desired communication interface.

10. An image processing system, comprising:
    an image processing apparatus; and
    an image input apparatus connected to the image processing apparatus through a network, wherein:
    the image processing apparatus includes:
    an image data obtaining device configured to store image data sent from the image input apparatus through the network in a specific storage area and to store sender identification information for identifying the image input apparatus in association with the obtained image data;
    an authorization management data storage device configured to store authorization management data that associates registered sender identification information for identifying a registered image input apparatus and authorization information indicating whether the registered image input apparatus is an authorized sender;
    an entry controller device configured to monitor the specific storage area to detect whether the image data is stored in the specific storage area, to determine whether the image input apparatus is the authorized sender by referring to the authorization information of the registered image input apparatus that matches the sender identification information of the image input apparatus to generate a determination result when storing of the image data in the specific storage area is detected, and to enter the image data for further processing according to the determination result indicating that the image input apparatus is the authorized sender; and a flow controller device configured to obtain flow data defining a sequence of one or more processes, and to apply the sequence of one or more processes to the entered image data according to the flow data, and the image input apparatus includes:

a user interface configured to receive a user instruction for requesting the image input apparatus to send the image data to the specific storage area; and an image data output device configured to send the image data to the image processing apparatus through the network while specifying the specific storage area.

11. The image processing system of claim 10, wherein the image input apparatus further includes an image data input device configured to obtain the image data by scanning an original image.

12. The image processing system of claim 10, further comprising:

a charge server device connected to the image processing apparatus through the network and configured to receive charge data obtained by the image processing apparatus through the network.

13. The image processing system of claim 10, further comprising:

a management device connected to the image processing apparatus through the network and configured to provide a user interface that allows a user to manage the authorization management data stored in the authorization management data storage device of the image processing apparatus.

14. A non-transitory computer readable recording medium storing a plurality of instructions which cause an image processing apparatus configured to connect to an image input apparatus through a network to perform an image processing method, the method comprising:

storing image data sent from the image input apparatus through the network in a specific storage area;

storing sender identification information for identifying the image input apparatus in association with the obtained image data;

storing authorization management data that associates registered sender identification information for identifying a registered image input apparatus and authorization information indicating whether the registered image input apparatus is an authorized sender;

monitoring the specific storage area to detect whether the image data is stored in the specific storage area;

determining whether the image input apparatus is the authorized sender by referring to the authorization information of the registered image input apparatus that matches the sender identification information of the image input apparatus to generate a determination result when storing of the image data in the specific storage area is detected;

entering the image data for further processing according to the determination result indicating that the image input apparatus is the authorized sender;

obtaining flow data defining a sequence of one or more processes; and applying the sequence of one or more processes to the entered image data according to the flow data.

15. The non-transitory computer readable recording medium of claim 14, wherein the method further comprises:

storing data that associates a plurality of flow data files and a plurality of specific storage areas, wherein the flow data for the image data being obtained is one of the plurality of flow data files that is made in association with one of the specific storage areas that matches the specific storage area storing the image data therein; and calculating a charge fee using at least one of information regarding the plurality of flow data files and information regarding the plurality of specific storage areas.

16. The non-transitory computer readable recording medium of claim 15, wherein the method further includes:

sending notification indicating that application of the sequence of one or more processes to the image data is completed; and calculating a charge fee using information regarding the flow data that matches the specific storage area.

17. The non-transitory computer readable recording medium of claim 14, wherein the method further comprises:

providing a user interface that allows a user to manage the authorization management data.

18. The non-transitory computer readable recording medium of claim 14, wherein the method further comprises:

storing bibliographic data obtained from the image input apparatus; and modifying the obtained flow data using information of the bibliographic data.

* * * * *